(12) United States Patent
Dix

(10) Patent No.: US 10,377,339 B2
(45) Date of Patent: Aug. 13, 2019

(54) SEATBELT TENSIONING ASSEMBLY

(71) Applicant: Nissan North America, Inc., Franklin, TN (US)

(72) Inventor: Jeffery Dix, Commerce, MI (US)

(73) Assignee: Nissan North America, Inc., Franklin, TN (US)

( * ) Notice: Subject to any disclaimer, the term of this patent is extended or adjusted under 35 U.S.C. 154(b) by 110 days.

(21) Appl. No.: 15/626,385

(22) Filed: Jun. 19, 2017

(65) Prior Publication Data

US 2018/0361986 A1 Dec. 20, 2018

(51) Int. Cl.
*B60R 22/28* (2006.01)

(52) U.S. Cl.
CPC ........ *B60R 22/28* (2013.01); *B60R 2022/281* (2013.01); *B60R 2022/288* (2013.01)

(58) Field of Classification Search
CPC .............. B60R 22/28; B60R 2022/288; B60R 2022/281
USPC ........................................ 297/471, 468, 470
See application file for complete search history.

(56) References Cited

U.S. PATENT DOCUMENTS

| 3,486,203 | A | 12/1969 | Cadiou |
| 4,588,207 | A | 5/1986 | Doty |
| 5,309,606 | A * | 5/1994 | Kawamura ............ A44B 11/10 24/171 |
| 5,664,807 | A | 9/1997 | Böhmler |
| 5,806,148 | A | 9/1998 | McFalls et al. |
| 7,784,874 | B2 | 8/2010 | Murph et al. |
| 8,801,038 | B2 * | 8/2014 | Hori ........................ B60R 22/00 24/196 |
| 9,068,306 | B2 * | 6/2015 | Gisslin .................... F16F 7/123 |
| 2017/0291572 | A1 * | 10/2017 | Burczyk ................. B60R 22/22 |

* cited by examiner

*Primary Examiner* — Mark R Wendell
(74) *Attorney, Agent, or Firm* — Global IP Counselors, LLP

(57) ABSTRACT

A seatbelt tensioning assembly having a seatbelt, a buckle tongue and a tensioning device. The buckle tongue is configured for releasable attachment to a seatbelt buckle within the passenger compartment. The tensioning device is rigidly connected to the buckle tongue with a mid-section of the seatbelt extending through a hollow interior of the tensioning device. The hollow interior of the tensioning device has a first tensioning member disposed therein at least partially defining a seatbelt path having a serpentine shape such that in the absence of tension being applied to the seatbelt the mid-portion of the seatbelt moves through the seatbelt path with the seatbelt path defining a first overall length. With a pre-determined level of tension being applied to the seatbelt, the tensioning device is configured to shorten the seatbelt path to a second overall length smaller than the first overall length.

19 Claims, 8 Drawing Sheets

SEATBELT TENSIONING ASSEMBLY

BACKGROUND

Field of the Invention

The present invention generally relates to a seatbelt tensioning assembly. More specifically, the present invention relates to a seatbelt tensioning assembly that is configured to increase an effective length of a seatbelt by a predetermined length in response to a predetermined amount of force being applied to the seatbelt.

Background Information

During a tensioning event, forces acting on a passenger seated in a vehicle seat cause corresponding forces to act on a seatbelt restraining the passenger.

SUMMARY

One object of the present disclosure is to provide a seatbelt with a tensioning assembly that absorbs a portion of forces acting on a passenger during a tensioning event, and using the absorbed forces to increase an effective length of the seatbelt by predetermined length.

In view of the state of the known technology, one aspect of the present disclosure is to provide a seatbelt tensioning assembly with a seatbelt, a buckle tongue and a tensioning device. The seatbelt has a first end and a second end that are each configured to attach to portions of a passenger compartment defined by a vehicle body structure. The seatbelt restricts movement of a seated passenger within the passenger compartment. The buckle tongue is configured for releasable attachment to a seatbelt buckle within the passenger compartment. The tensioning device is rigidly connected to the buckle tongue. A mid-section of the seatbelt extends through a hollow interior of the tensioning device. The hollow interior of the tensioning device has a first tensioning member disposed therein at least partially defining a seatbelt path. The seatbelt path has a serpentine shape such that in the absence of tension being applied to the seatbelt, the mid-portion of the seatbelt moves through the seatbelt path with the seatbelt path defining a first overall length. Further, in response to a pre-determined level of tension being applied to the seatbelt the tensioning device, the tensioning device is configured to lengthen the seatbelt path to a second overall length longer than the first overall length by a predetermined distance.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
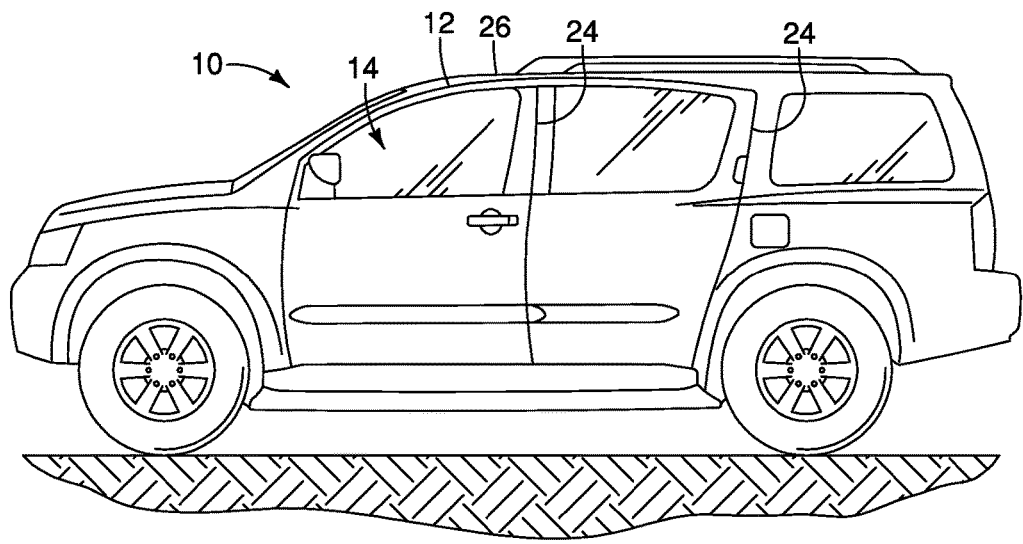
FIG. 1 is a side view of a vehicle that includes passenger compartment with a seatbelt assembly in accordance with a first embodiment.

Referring initially to FIG. 1, a vehicle 10 is illustrated in accordance with a first embodiment. The vehicle 10 includes a vehicle body structure 12 that defines a passenger compartment 14 with front seat assemblies 16 and rear seat assemblies 18, each seat having corresponding seatbelt tensioning assembly 20, as described in greater detail below.

Figure 2:
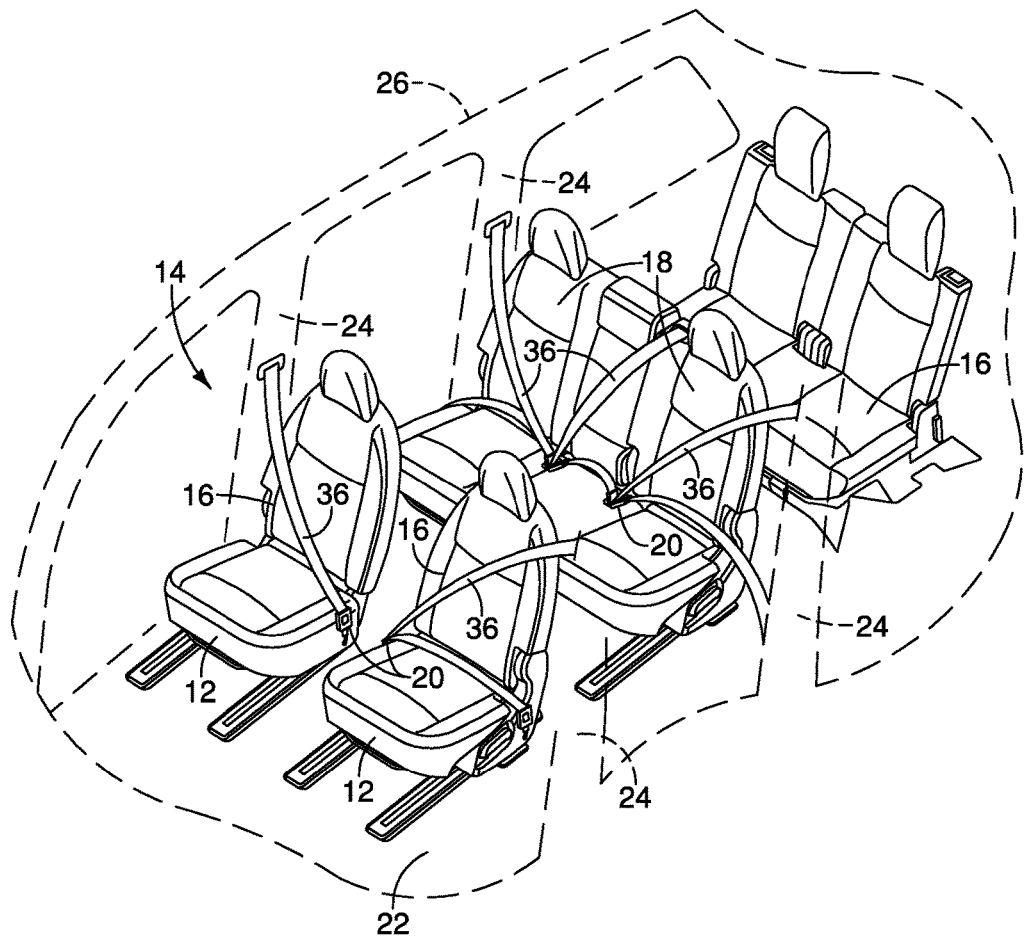
FIG. 2 is a perspective view of the vehicle showing the passenger compartment, a floor structure, pillar structures, seat assemblies and seatbelt assemblies that include corresponding tensioning assemblies in accordance with the first embodiment.

The vehicle 10 further includes a floor structure 22, pillar structures 24 and a roof structure 26 that at least partially define the passenger compartment 16, as shown in FIG. 2.

Figure 3:
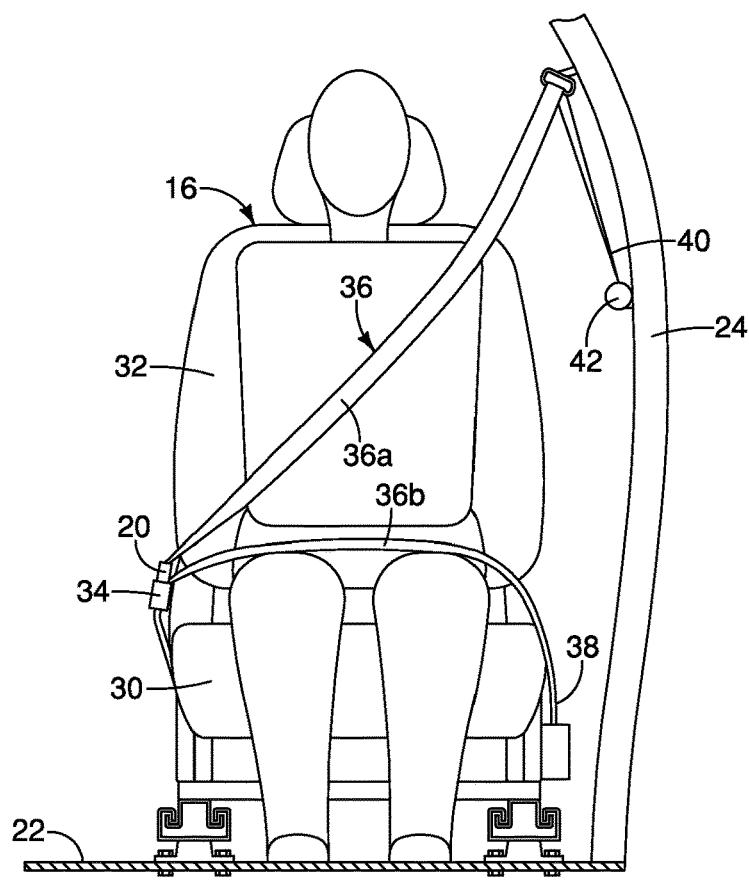
FIG. 3 is a front view of one of the seat assemblies showing the seatbelt assembly and corresponding tensioning assembly in accordance with the first embodiment.

As depicted in FIG. 3, one of the front seat assemblies 16 is shown removed from the vehicle 10. Since the front seat assemblies 16 and the rear seat assemblies 18 have generally the same features with respect to the seatbelt tensioning assemblies 20, only one seat assembly, the front seat assembly 16, is described herein below for the sake of brevity. However, the description of the front seat assembly 16 applies equally to the rear seat assemblies 16.

The front seat assembly 16 (hereinafter referred to as the seat assembly 16) has a seat cushion portion 30, a seatback portion 32 and a seatbelt latch or buckle 34. The seat cushion portion 30 is configured to attach to the floor structure 22 within the passenger compartment 14 of the vehicle 10, as shown in FIGS. 2 and 3. As shown in FIG. 3, the seatback portion 32 supported to the seat cushion portion 30 in a conventional manner. The seatback portion 32 can optionally include an angle adjusting mechanism (not shown) that allows the seatback portion 32 to be reclined relative to the seat cushion portion 30.

As shown in FIG. 3, the seat assembly 16 includes a seatbelt 36 having a first end 38, a second end 40 and a retraction mechanism 42. The first end 38 is attached to the seat cushion portion 30. Alternatively, the first end 38 can be fixedly attached (not shown) to the floor structure 22 of the vehicle 10. The retraction mechanism 42 is depicted as being fixed to the pillar structure 24 of the vehicle 10. The second end 40 of the seatbelt 36 is attached to the retraction mechanism 42 and is retracted into the retraction mechanism 42 when not in use. The seatbelt 36 is configured to restrict movement of a seated passenger in the seat assembly 16 within the passenger compartment 14 when in use. Since seatbelts and retraction mechanisms 42 are conventional features, further description is omitted for the sake of brevity.

As shown in FIG. 3, the seatbelt tensioning assembly 20 includes a buckle tongue 44 and a tensioning device 46. The buckle tongue 44 is configured for releasable attachment to the seatbelt buckle 34. Specifically, the seatbelt buckle 34 includes a latching mechanism (not shown) that retains the buckle tongue 44 within the seatbelt buckle 34. The seatbelt buckle 34 is configured to release the buckle tongue 44 when the latching mechanism (not shown) of the seatbelt buckle 34 is operated. Since seatbelt buckles and latching mechanisms are conventional structures and mechanisms, further description is omitted for the sake of brevity.

Figure 4:
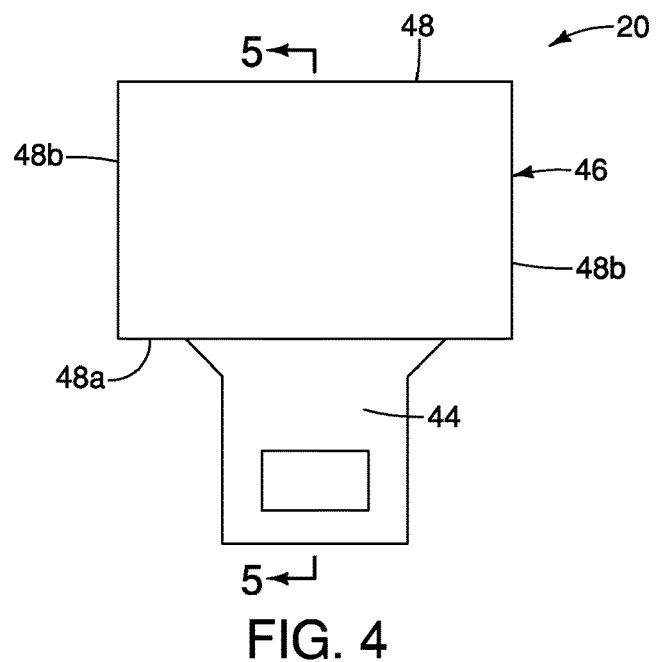
FIG. 4 is a plan view of the tensioning assembly including a buckle tongue shown removed from the seatbelt assembly in accordance with the first embodiment.

In the depicted embodiment, the tensioning device 46 and the buckle tongue 44 are manufactured together as a single mechanism, as shown in FIG. 4. Alternatively, the tensioning device 46 and the buckle tongue 44 can be separate elements connected to one another by the seatbelt 36.

Figure 5:
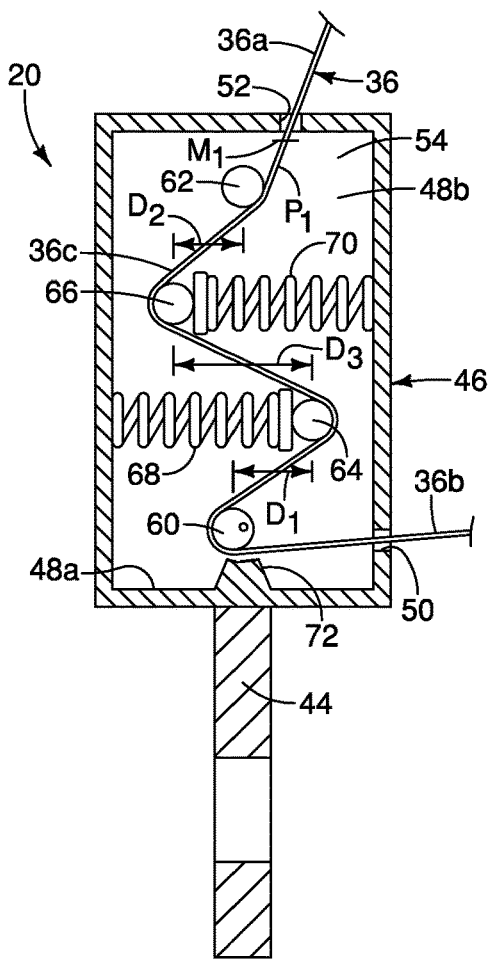
FIG. 5 is a cross-sectional view of the tensioning assembly taken along the line 5-5 in FIG. 4, showing elements of the tensioning assembly including a housing, a first guide member, a second guide member, a first tensioning member, a second tensioning member, a first biasing member and a second biasing member, showing the first and second biasing members in a non-compressed state in accordance with the first embodiment.
Figure 6:
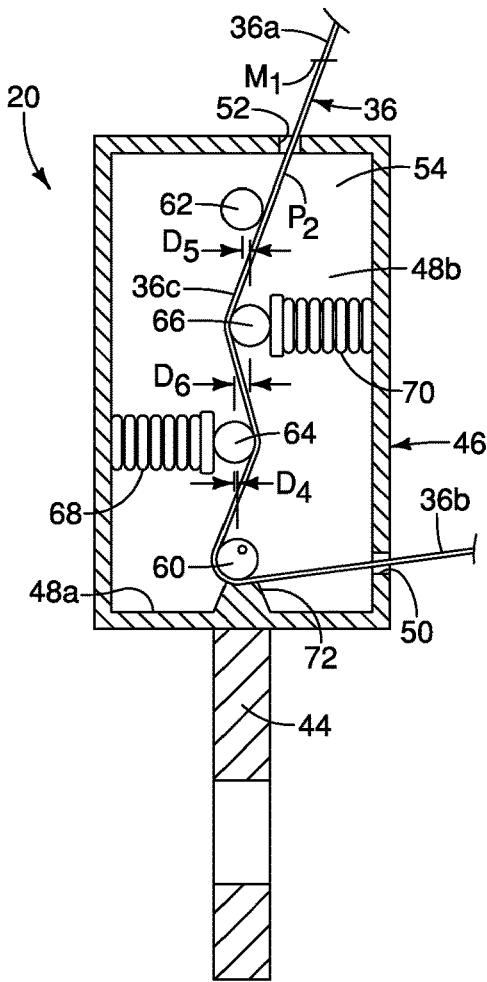
FIG. 6 is another cross-sectional view of the tensioning assembly similar to FIG. 5, showing the first biasing member and the second biasing member in a compressed state in accordance with the first embodiment.
Figure 7:
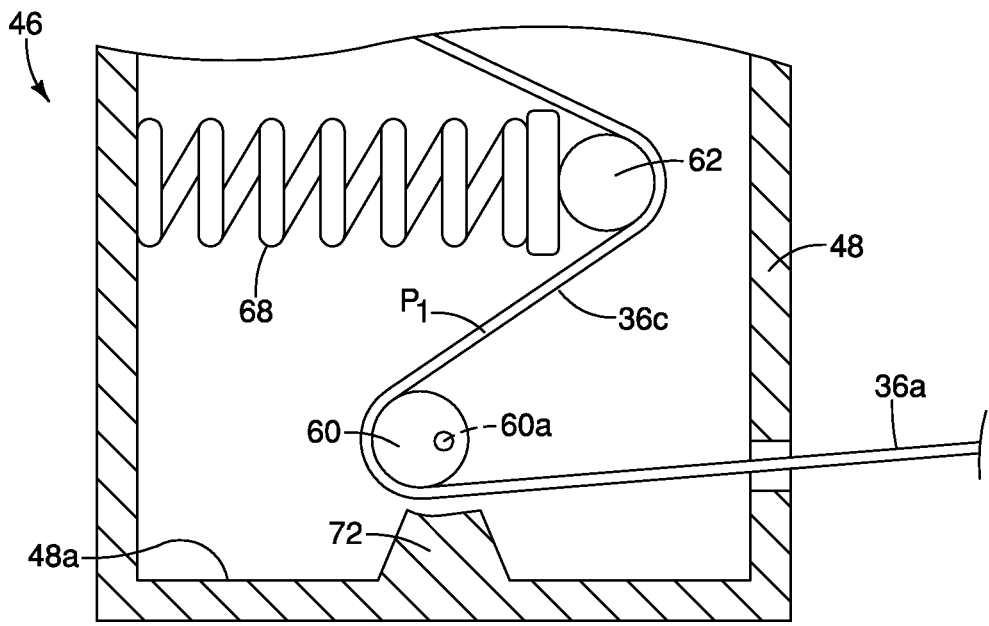
FIG. 7 is a cross-sectional view of a portion of the housing of the tensioning assembly showing the first guide member in an unlocked orientation relative to a projection provided within the housing of the tensioning member such that in the unlocked orientation the seatbelt can slide between the first guide member and the projection in accordance with the first embodiment.

In the first embodiment as shown in FIGS. 5, 6 and 7, the tensioning device 46 includes a housing 48 having a first opening 50 (also referred to as a first seatbelt opening) and a second opening 52 (also referred to as a second seatbelt opening). The buckle tongue 44 is welded, formed with, or otherwise fixedly attached to the housing 48.

As shown in FIG. 3, the seatbelt 36 defines a torso restraining portion 36a and a waist restraining portion 36b. As shown in FIGS. 5 and 6, the seatbelt 36 also includes a mid-portion 36c between the torso restraining portion 36a and the waist restraining portion 36b. The mid-portion 36c is located within the housing 48 of the tensioning device 46. As is described in greater detail below, in the absence of tension on the seatbelt 36, the seatbelt 36 can be moved through the housing 48. Therefore, the mid-portion 36c is not a fixed section or fixed segment of the seatbelt 36, but rather, is the section of the mid-portion 36c currently located within the housing 48.

Figure 8:
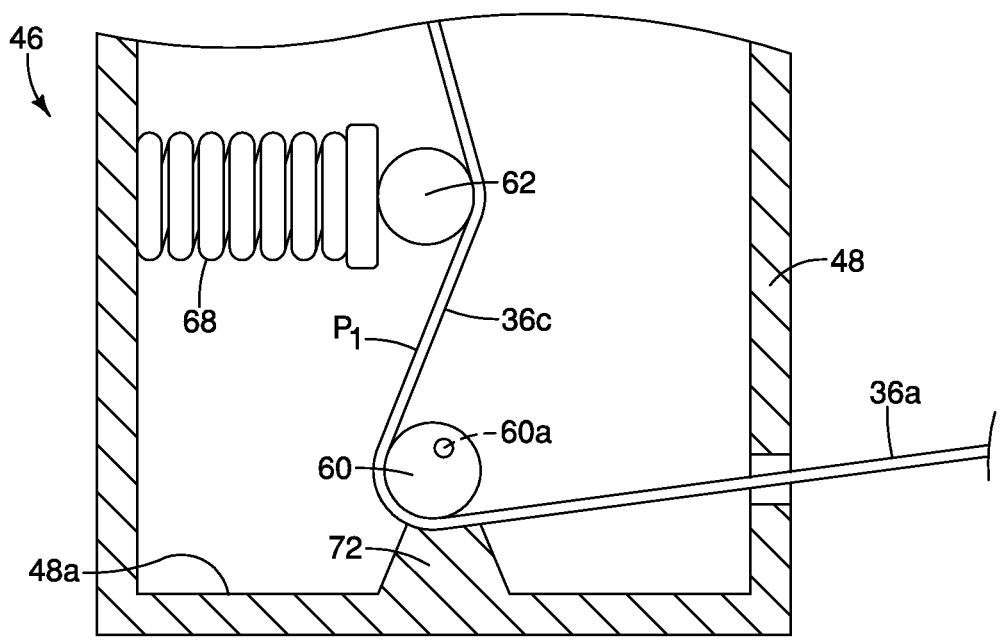
FIG. 8 is another cross-sectional view of a portion of the housing of the tensioning assembly showing the first guide member pivoted to a locked orientation such that the seatbelt is clamped between the first guide member and the projection restricting movement of the seatbelt between the first guide member and the projection in accordance with the first embodiment.
Figure 9:
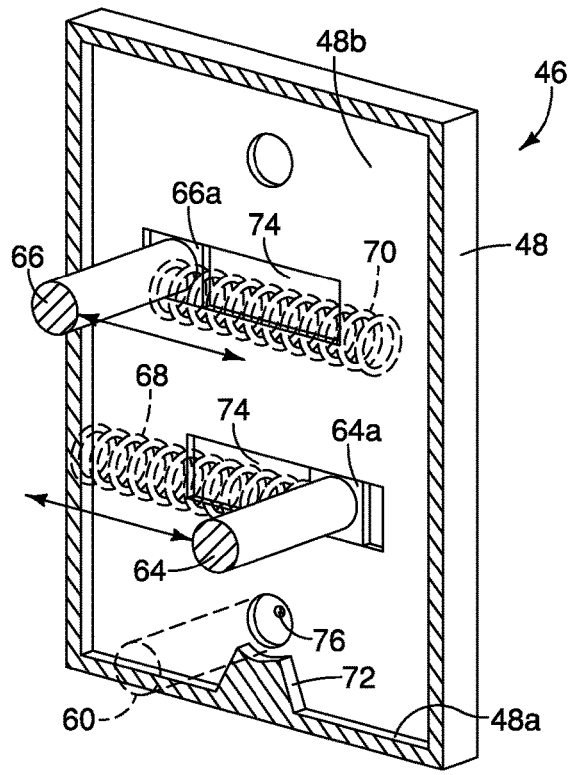
FIG. 9 is a perspective cross-sectional view of an inner side wall of the housing showing slots and apertures, the slots being configured to receive the first and second tensioning members for sliding movement against the force of respective ones of the first and second biasing members in accordance with the first embodiment.

The housing 48 defines a hollow interior 54. The first opening 50 and the second opening 52 are both open to the hollow interior 54, exposing the hollow interior 54. Within the hollow interior 54 of the housing 48, the tensioning device 46 is provided with a first guide member 60, a second guide member 62, a first tensioning member 64, a second tensioning member 66, a first biasing member 68 and a second biasing member 70. As shown in FIGS. 5-8, within the hollow interior 54, a bottom wall 48a of the housing 48 includes a projection 72 that is described in greater detail below. As shown in FIG. 9, within the hollow interior 54, side walls 48b of the housing 48 define slots 74 and a bore 76 that are also described in greater detail below.

In FIGS. 5-8, the first guide member 60 is depicted with a cylindrical shape in cross-section, but can have an egg shape or oblong shape as viewed in cross-section. Opposite ends of the first guide member 60 include a respective one of shaft projections 60a that extend into respective ones of the bores 76 defined in the side walls 48b of the housing 48. The shaft projections 60a are off-center with respect to the first guide member 60.

The first guide member 60 is supported within hollow interior 54 of the housing 48 adjacent to the first opening 50. The first guide member 60 and the projection 72 define a locking mechanism that selectively prevents movement of the seatbelt 36 in response to rapid movement of the seatbelt 36 out of the first opening 50.

Specifically, as shown in FIGS. 5-8, the first guide member 60 is movable between an unlocked orientation (FIGS. 5 and 7) and a locked orientation (FIGS. 6 and 8) as a result of the shaft projections 60a being off-center. In FIGS. 5 and 7, the first guide member 60 is biased by a coil spring (not shown) to the unlocked orientation. In response to rapid movement of the seatbelt 36 out of the first opening 50, the seatbelt 36 pulls on the first guide member 60 causing it to pivot about the shaft projections 60a, moving the first guide member 60 to force the seatbelt 36 against the projection 72. Hence, in the locked orientation (FIGS. 6 and 8) the seatbelt 36 is prevented from moving, being sandwiched or clamped between the first guide member 60 and the projection 72.

The second guide member 62 can rotate about a centered shaft (not shown) or can be fixed to the side walls 48b within the hollow interior 54 of the housing 48. The second guide member 62 is supported within the housing 48 adjacent to the second opening 52.

The first tensioning member 64 is disposed with the hollow interior 54 of the housing 48 for operation between the first guide member 60 and the second guide member 62, as is described further below. The first tensioning member 64 is supported within the hollow interior 54 of the housing 48 between the side walls 48b. Specifically, the first tensioning member 64 is supported by two sliders 64a (only one is shown in FIG. 9). The sliders 64a are slidably supported within the slots 74. The first tensioning member 64 can be rigidly fixed to the sliders 64a or can be rotatably supported to the sliders 64a by shafts (not shown).

The first tensioning member 64 is biased toward the right side of the hollow interior 54 of the housing 48 by the first biasing member 68, as per the depiction in FIG. 5. The first biasing member 68 is positioned to apply a predetermined biasing force to the first tensioning member 64 such that with the first biasing member 68 in a non-compressed state (FIG. 5), the first biasing member 68 biases the first tensioning member 64 to move a predetermined distance (in a lateral direction) away from the first guide member 60 and the second guide member 62.

The second tensioning member 66 is disposed with the hollow interior 54 of the housing 48 for operation between the first guide member 60 and the second guide member 62. More specifically, the second tensioning member 66 is located above the first tensioning member 66 but below the second guide member 62, as per the depiction in FIGS. 5 and 6. The second tensioning member 66 is supported within the hollow interior 54 of the housing 48 between the side walls 48b. Specifically, the second tensioning member 66 is supported by two sliders 66a (only one is shown in FIG. 9). The sliders 66a are slidably supported within the upper of the pair of slots 74 above the first tensioning member 64. The second tensioning member 66 can be rigidly fixed to the sliders 66a or can be rotatably supported to the sliders 66a by shafts (not shown).

The second tensioning member 66 is biased toward the left side of the hollow interior 54 of the housing 48 by the second biasing member 70, as per the depiction in FIG. 5. The second biasing member 70 is positioned to apply a predetermined biasing force to the second tensioning member 66 such that with the second biasing member 70 in a non-compressed state (FIG. 5), the second biasing member 70 biases the second tensioning member 66 to move a predetermined distance (in a lateral direction) away from the first guide member 60 and the second guide member 62.

The first guide member 60, the first tensioning member 64, the second tensioning member 66 and the second guide member 62 define a seatbelt path ($P_1$ or $P_2$) within the housing 48 of the tensioning device 46 followed by the mid-portion 36c of the seatbelt 36. With the first and second biasing members 68 and 70 in the non-compressed state, the seatbelt path has an overall path shape $P_1$, as shown in FIG. 5. The overall path shape $P_1$ has a serpentine shape meandering around the first and second guide members 60 and 62 and the first and second tensioning members 64 and 66. When a predetermined amount of tension has been applied to the seatbelt 36 (as described further below), the first tensioning member 64, the second tensioning member 66 compress their respective biasing members, the first and second biasing members 68 and 70, (a compressed state or tensioned state) as shown in FIG. 6. In response to the predetermined amount of tension being applied to the seatbelt 36, the shape of the seatbelt path changes from the overall path shape $P_1$ (FIG. 5) to the overall path shape $P_2$ (FIG. 6).

As shown in FIG. 5, the seatbelt path followed by the seatbelt 36 has a serpentine shape that is defined by the seatbelt 36 as is extends around the various elements within the housing 48. Specifically, the mid-portion 36c of the seatbelt 36 extends along the seatbelt path from the first opening 50 (a seatbelt opening) to the first guide member 60 and further extends partway around the first guide member 60 curving toward the first tensioning member 64. The seatbelt 36 then extends partway around the first tensioning member 64 toward the second tensioning member 66, extends partway around the second tensioning member 66 and to the second guide member 62. Thereafter, the seatbelt 36 extends partway around the second guide member 36 and to the second opening 62.

With the first and second biasing members 68 and 70 in the non-compressed state (FIG. 5), the seatbelt 36 defines the seatbelt path with the overall path shape $P_1$. As can be seen visually, the overall path shape $P_1$ defines a first overall length $L_1$ measured from the first opening 50 to the second opening 52. With the first and second biasing members 68 and 70 in the compressed state (FIG. 6), the seatbelt 36 defines the seatbelt path with the overall path shape $P_2$. As can be seen visually, the overall path shape $P_2$ defines a second overall length $L_2$ measured from the first opening 50 to the second opening 52 that is shorter than the first overall length $L_1$. Put another way, the overall length of the mid-portion 36c of the seatbelt 36 within the housing 48 is greater with the first and second biasing members 68 and 70 in the non-compressed state (FIG. 5), as compared with the first and second biasing members 68 and 70 in the compressed state (FIG. 6).

The difference in size of the first overall length $L_1$ compared to the second overall length $L_2$ can be demonstrated by, for example, the movement of the first and second tensioning members 64 and 66. With the first biasing member 68 in the non-compressed state in FIG. 5, the first tensioning member 64 is located a first lateral distance $D_1$ away from the first guide member 60 and approximately the first lateral distance $D_1$ away from the second guide member 62, where the first lateral distance $D_1$ is measured in the direction of movement of the first tensioning member 64. Similarly, with the second biasing member 70 in the non-compressed state in FIG. 5, the second tensioning member 66 is located a second lateral distance $D_2$ away from the second guide member 62 and approximately the second lateral distance $D_2$ away from the first guide member 60, where the second lateral distance $D_2$ is measured in the direction of movement of the second tensioning member 66. As well, the first tensioning member 64 is located a third lateral distance $D_3$ away from the second tensioning member 66.

In contrast, with the first biasing member 68 in the compressed state in FIG. 6, the first tensioning member 64 is located a fourth lateral distance $D_4$ away from the first guide member 60 and approximately the fourth lateral distance $D_4$ away from the second guide member 62. Similarly, with the second biasing member 70 in the compressed state in FIG. 6, the second tensioning member 66 is located a fifth lateral distance $D_5$ away from the second guide member 62 and approximately the fifth lateral distance $D_5$ away from the first guide member 60. As well, the first tensioning member 64 is located a sixth lateral distance $D_6$ away from the second tensioning member 66.

As is demonstrated by comparing FIGS. 5 and 6, the first lateral distance $D_1$ is much greater than the fourth lateral distance $D_4$; the second lateral distance $D_2$ is much greater than the fifth lateral distance $D_5$; and the third lateral distance $D_3$ is much greater than the sixth lateral distance $D_6$. Hence, the first overall length $L_1$ is comparatively larger than the second overall length $L_2$. It should be understood from the drawings and the description herein, that simple geometric and trigonometric relationships can be used to determine specific differences between the first overall length $L_1$ and the second overall length $L_2$.

Further, a marker $M_1$ has been drawn on the seatbelt 36 in FIG. 5. With the first and second biasing members 68 and 70 moved to the compressed orientation, the mid-portion 36c of the seatbelt 36 (the portion of the seatbelt 36 located within the housing 48) shortens, as shown in FIG. 6. More specifically, the marker $M_1$ shows the extent of the seatbelt 36 that has been drawn out of the housing 48 due to tension on the seatbelt 36, the corresponding force being applied to the first and second tensioning members 64 and 66, and subsequent compression of the first and second biasing members 68 and 70. Hence, the first overall length $L_1$ corresponds to the amount (length) of the mid-portion 36c of the seatbelt 36 located within the housing 48 with no tension on the seatbelt 36, as shown in FIG. 5. The second overall length $L_2$ corresponds to amount (length) of the mid-portion 36c of the seatbelt 36 located within the housing 48 with tension being applied to the seatbelt 36 compressing the first and second biasing members 68 and 70, as shown in FIG. 6.

The tensioning assembly 20 operates as follows. When the seatbelt 36 is not strapped across a passenger, as shown in FIG. 3, there is little or no noticeable tension on the seatbelt 36. In a non-tensioned state, the seatbelt 36 can be moved relative to the tensioning assembly 20. Specifically, the length of the torso restraining portion 36a and the length of the waist restraining portion 36b can be adjusted to accommodate various sizes of passengers. More specifically, the mid-portion 36c of the seatbelt 36 can slide through the housing 48. Hence, the actual section of the seatbelt 36 that defines the mid-portion 36c can change as the seatbelt 36 passes through the housing 48.

As shown in FIG. 3, once a passenger is seated in the seat assembly 16, the passenger takes the tensioning device 46 and inserts the buckle tongue 44 into the buckle 34, thereby securing the tensioning device 46 and the buckle tongue 44 in position. In this state, there is a small level of tension on the seatbelt 36 and the seatbelt 36 is less likely to slide through the housing 48.

As the vehicle 10 is operated, various dynamic forces act on the passenger in the seat assembly 16, placing corresponding forces on the seatbelt 36. For example, when the vehicle 10 slows down (decelerates), the change in momentum of the passenger causes tensioning of the seatbelt 36. In most normal driving related decelerating circumstances, the dynamic forces acting on the passenger and the seatbelt 36 can occasionally cause the locking mechanism to engage, with the waist retraining portion 36b of the seatbelt 36 applying sufficient force to the first guide member 60 causing it to pivot toward the projection 72, clamping the seatbelt 36 therebetween, as shown in FIG. 8.

When the vehicle 10 is being driven in a conventional manner, tensioning events can occur at any time. As used herein, tensioning events are basically dynamic changes during which the vehicle 10 experiences rapid changes in velocity and acceleration. Tensioning events can be divided into two categories: non-impact related tensioning events and impact related tensioning events. The non-impact related tensioning events include events such as a vehicle operator forcefully and rapidly applying braking force causing the vehicle 10 to come to a rapid complete stop, or to slow down rapidly (i.e., rapid deceleration or rapid reduction in velocity). Another example of rapid deceleration is the driving of the vehicle 10 into a significant depth of water (more than a few inches of water, such as more than 3 or 4 inches of water). Such events causes rapid changes in acceleration and velocity of the vehicle 10, but are not necessarily associated with an impact event. Impact related tensioning event can be in the form of the vehicle contacting a fixed object or another vehicle and therefore coming to an almost immediate and complete stop in only a second or two.

During either of the above described tensioning events, rapid changes in the momentum of the passenger in the seat assembly 16 can transfer large levels of forces to the seatbelt 36. A portion of these forces are applied to the waist restraining portion 36b of the seatbelt 36, putting the seatbelt 36 in tension, causing the locking mechanism (the first guide member 60 and the projection 72) to limit movement of the waist restraining portion 36b of the seatbelt 36. Tension is also applied by the passenger's torso to the torso restraining portion 36a. Once a predetermined level of tension has been applied to the torso restraining portion 36a of the seatbelt 36, the mid-portion 36c of the seatbelt 36 within the housing 48 receives proportional amounts of tensioning force. This tensioning force in tern acts on the first tensioning member 64 and the second tensioning member 66 causing the first biasing member 68 and the second biasing member 70 to compress, as shown in FIG. 6.

As described above, compression of the first biasing member 68 and the second biasing member 70 causes a change in the overall length of the seatbelt path within the housing 48. Specifically, as tension acting on the seatbelt 36 compresses the first biasing member 68 and the second biasing member 70, seatbelt path shortens from the first overall length $L_1$ shown in FIG. 5 to the second overall length $L_2$. The reduction of the overall length of the seatbelt path within the housing 48 allows the torso restraining portion 36a to lengthen by a predetermined distance corresponding to the movement of the marker $M_1$ drawn on the seatbelt 36. The predetermined distance (increase in length of the torso restraining portion 36a) corresponds to the movement of the marker $M_1$ from its location in FIG. 5 to its location in FIG. 6. The predetermined distance can be anywhere from 1 mm to several centimeters, depending upon the design of the vehicle 10 and/or the design of the seat assembly 16.

The lengthening of the torso restraining portion 36a allows for limited movement of the torso of the passenger during the tensioning event.

After completion of the tensioning event and with sufficient time for the tensioning device 46 to reach an equilibrium of forces acting on the various portions of the seatbelt 36, the first and second biasing members 68 and 70 can expand, returning to the non-compressed state.

Second Embodiment

Figure 10:
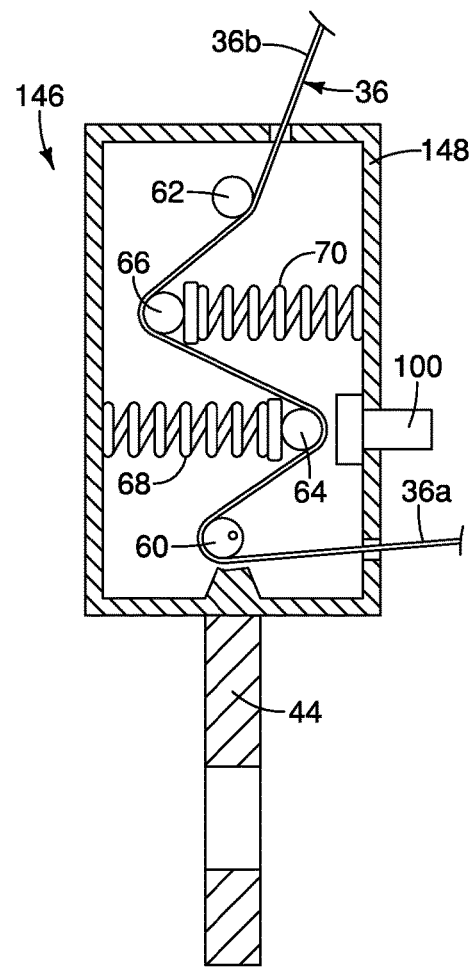
FIG. 10 is a cross-sectional view similar to FIG. 5 showing a tensioning assembly that includes a housing, a first guide member, a second guide member, a first tensioning member, a second tensioning member, a first biasing member, a second biasing member and a release mechanism, showing the first and second biasing members in a non-compressed state in accordance with a second embodiment.
Figure 11:
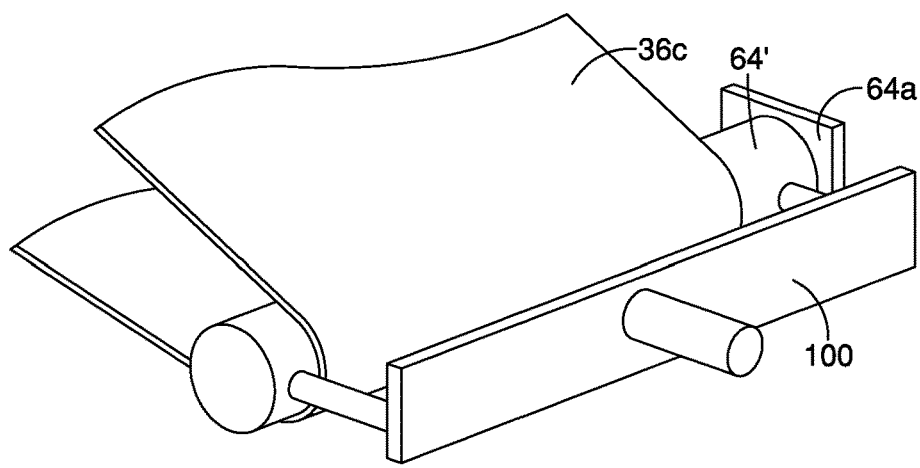
FIG. 11 is a perspective view of the first tensioning mechanism and the release mechanism shown removed from the tensioning assembly in accordance with the second embodiment.

Referring now to FIGS. 10 and 11, a tensioning device 146 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The tensioning device 146 includes all of the features of the tensioning device 46 of the first embodiment, such as a modified housing 148 (similar to the housing 48 of the first embodiment) that has the first guide member 60, the second guide member 62, the first tensioning member 64, the second tensioning member 66, the first biasing member 68 and the second biasing member 70. Additionally, the housing 148 includes a release mechanism 100 that is connected to the first tensioning member 64, such that when the release mechanism 100 is pressed from outside the housing 148, the first tensioning member 64 is moved thereby compressing the first biasing member 68 in order to relieve possible tension on the seatbelt 36.

Third Embodiment

Figure 12:
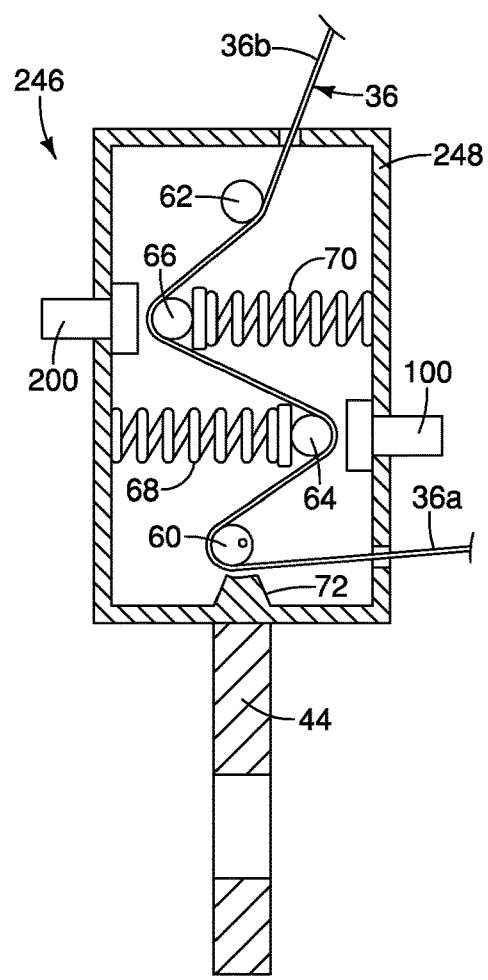
FIG. 12 is a cross-sectional view of a modified tensioning assembly having all of the features of the tensioning assembly depicted in FIGS. 10 and 11, but including a second release mechanism accordance with a third embodiment.

Referring now to FIG. 12, a tensioning device 246 in accordance with a third embodiment will now be explained. In view of the similarity between the first, second and third embodiments, the parts of the third embodiment that are identical to the parts of the first and second embodiments will be given the same reference numerals as the parts of the first and second embodiments. Moreover, the descriptions of the parts of the third embodiment that are identical to the parts of the first and second embodiments may be omitted for the sake of brevity.

The tensioning device 246 includes all of the features of the tensioning devices 46 and 146 of the first and second embodiments, such as a further modified housing 248 that has the first guide member 60, the second guide member 62, the first tensioning member 64, the second tensioning member 66, the first biasing member 68 and the second biasing member 70. Additionally, the housing 248 includes the release mechanism 100 that is connected to the first tensioning member 64, such that when the release mechanism 100 is pressed from outside the housing 148, the first tensioning member 64 is moved thereby compressing the first biasing member 68 in order to relieve possible tension on the seatbelt 36. The housing 248 also includes a second release mechanism 200 that is connected to the second tensioning member 66, such that when the release mechanism 200 is pressed from outside the housing 248, the second tensioning member 66 is moved thereby compressing the second biasing member 70 in order to relieve possible tension on the seatbelt 36.

Fourth Embodiment

Figure 13:
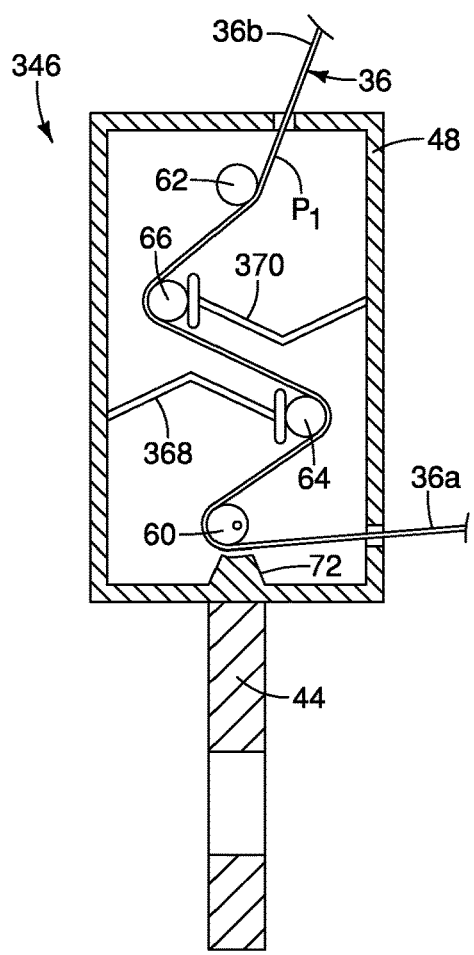
FIG. 13 is a cross-sectional view of the tensioning assembly similar to FIG. 5, showing elements of the tensioning assembly including a housing, a first guide member, a second guide member, a first tensioning member, a second tensioning member, a first biasing member and a second biasing member, showing the first and second biasing members in a non-compressed state, and where the first and second biasing members are each defined by undulated deformable metal plates in accordance with a fourth embodiment.
Figure 14:
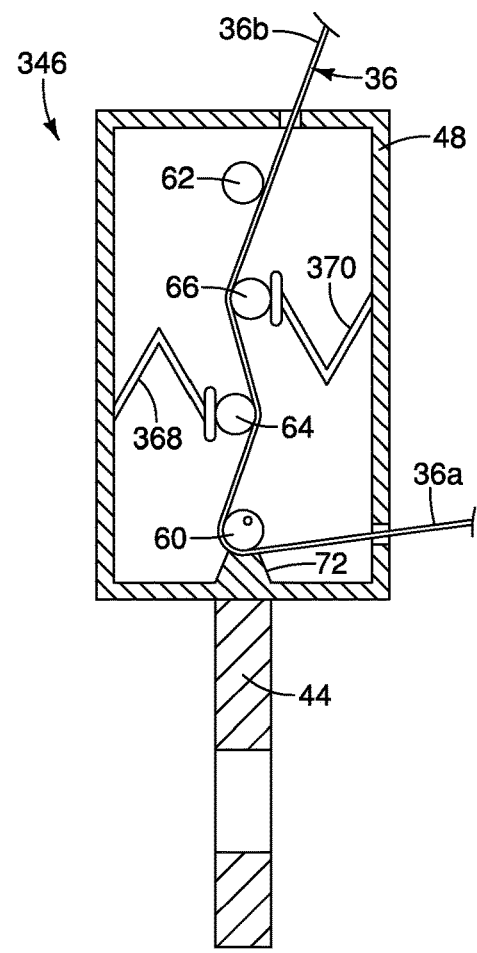
FIG. 14 is another cross-sectional view of the tensioning assembly similar to FIG. 13, showing the first biasing member and the second biasing member in a compressed state in accordance with the fourth embodiment.

Referring now to FIGS. 13 and 14, a tensioning device 346 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The tensioning device 346 includes all of the features of the tensioning device 46 of the first embodiment, such as the housing 48, the first guide member 60, the second guide member 62, the first tensioning member 64 and the second tensioning member 66. However, in the fourth embodiment, the first biasing member 68 and the second biasing member 70 of the first embodiment have been replace with a first biasing member 368 and a second biasing member 370.

In the first embodiment, the first biasing member 68 and the second biasing member 70 were both coil springs. In the fourth embodiment, the first biasing member 368 and the second biasing member 370 are defined by metallic sheet members that have been bent or creased to define a V-shape or U-shape. The first biasing member 368 and the second biasing member 370 can be made of material that provides them with resiliency such that the first biasing member 368 and the second biasing member 370 can return to the non-compressed state shown in FIG. 13, after being compressed, as shown in FIG. 14. Alternatively, the first biasing member 368 and the second biasing member 370 can be configured for a one-time usage only such that upon compression in response to a tensioning event, the first biasing member 368 and the second biasing member 370 are permanently deformed and must be replaced.

Fifth Embodiment

Figure 15:
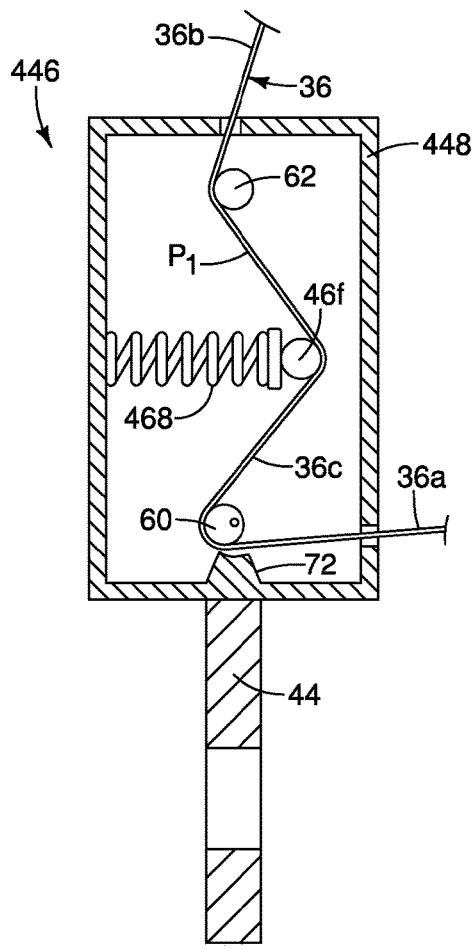
FIG. 15 is a cross-sectional view of a tensioning assembly similar to FIG. 5, showing elements of the tensioning assembly including a housing, a first guide member, a second guide member, a single tensioning member and a single biasing member showing the biasing member in a non-compressed state in accordance with a fifth embodiment.

Referring now to FIG. 15 a tensioning device 446 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

The tensioning device 446 includes some of the features of the tensioning device 46 of the first embodiment, but not all. For instance, the housing 48 of the first embodiment has been modified as a housing 448 which includes the first guide member 60 and the second guide member 62. However, in the fifth embodiment, only a single tensioning member 464 is provided and is biased by a biasing member 468.

Operation and function of the tensioning device 446 is basically the same as the first embodiment, except that only the biasing member 468 is compressed by the tensioning member 464 in response to a predetermined level of tension being applied via the seatbelt 36.

Sixth Embodiment

Figure 16:
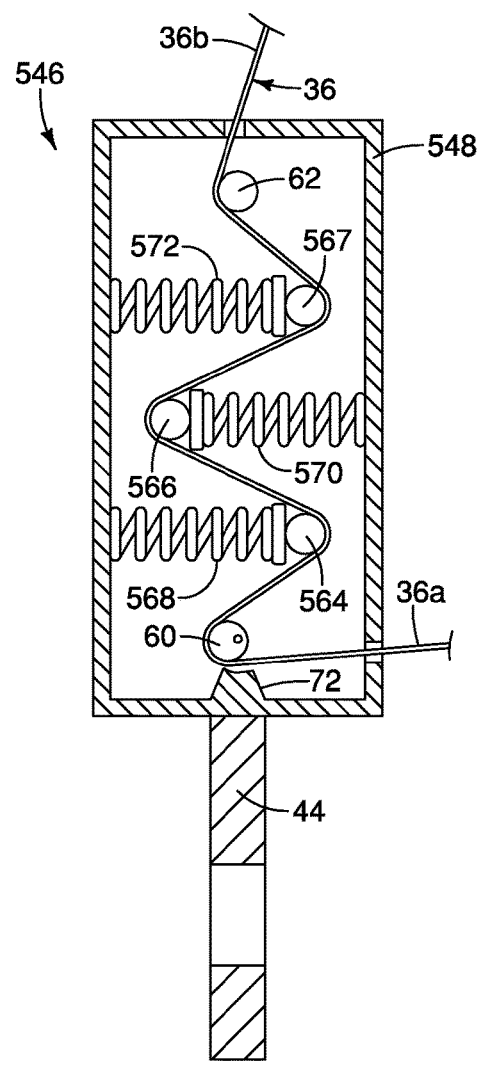
FIG. 16 is a cross-sectional view of a tensioning assembly similar to FIG. 5, showing elements of the tensioning assembly including a housing, a first guide member, a second guide member, a first tensioning member, a second tensioning member, a third tensioning member, a first biasing member, a second biasing member and a third biasing member, showing the first, second and third biasing members in a non-compressed state in accordance with a sixth embodiment.

Referring now to FIG. 16, a tensioning device 546 in accordance with a sixth embodiment will now be explained. In view of the similarity between the first and sixth embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the sixth embodiment, the tensioning device 546 includes a housing 548 that has been modified, as compared to the housing 48 of the first embodiment. Specifically, the housing 548 has been modified to include addition elements, described below.

The tensioning device 546 includes a first guide member 560 (similar to the first guide member 60), a second guide member 562 (similar to the second guide member 62), a first tensioning member 564 (similar to the first tensioning member 64), a second tensioning member 566 (similar to the second tensioning member 64), a third tensioning member 567, a first biasing member 568 (similar to the first biasing member 68), a second biasing member 570 similar to the second biasing member 70) and a third biasing member 572.

Operation and function of the tensioning device 546 is basically the same as the operation of the tensioning device 46, except that the third tensioning member 567 and the third biasing member 572 provide additional flexibility in configuring the tensioning response there from in response to a predetermined level of tension being applied via the seatbelt 36.

The various elements of the vehicle 10, other than the tensioning assembly, are conventional components that are well known in the art. Since vehicle elements are well known in the art, these structures will not be discussed or illustrated in detail herein. Rather, it will be apparent to those skilled in the art from this disclosure that the components can be any type of structure that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the seatbelt tensioning assembly. Accordingly, these terms, as utilized to describe the present invention should be interpreted relative to a vehicle equipped with the seatbelt tensioning assembly.

The term "configured" as used herein to describe a component, section or part of a device includes hardware that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A seatbelt tensioning assembly, comprising:
   a seatbelt having a first end and a second end that are each configured to attach to portions of a passenger compartment defined by a vehicle body structure, the seatbelt restricting movement of a seated passenger within the passenger compartment;
   a buckle tongue configured for releasable attachment to a seatbelt buckle within the passenger compartment, the seatbelt defining a first effective length with the buckle tongue attached to the seatbelt buckle restricting movement of the seated passenger, the first effective length including the lengths of at least a torso restraining portion and waist restraining portion of the seatbelt; and
   a tensioning device rigidly connected to the buckle tongue with a mid-section of the seatbelt extending through a hollow interior of the tensioning device, the hollow interior of the tensioning device having a first tensioning member disposed therein at least partially defining a seatbelt path within the hollow interior having a serpentine shape such that in the absence of tension being applied to the seatbelt the mid-portion of the seatbelt moves through the seatbelt path with the seatbelt having the first effective length, and with a predetermined level of tension being applied to the seatbelt the tensioning device is configured to lengthen the seatbelt to a second effective length longer than the first effective length by a predetermined distance such that at least one of the torso restraining portion or the waist restraining portion lengthens.

2. The seatbelt tensioning assembly according to claim 1, wherein
   the tensioning device includes a housing that defines the hollow interior, a first seatbelt opening exposing the hollow interior and a second seatbelt opening exposing the hollow interior, the seatbelt path being defined within the hollow interior with the seatbelt extending through the first seatbelt opening, through the hollow interior, at least partway around the tensioning member and through the second seatbelt opening.

3. The seatbelt tensioning assembly according to claim 2, wherein
   the tensioning device further includes:
      a first guide member supported within hollow interior of the housing adjacent to the first seatbelt opening;
      a second guide member supported within the housing adjacent to the second seatbelt opening; and
      the first tensioning member disposed with the housing operably between the first guide member and the second guide member.

4. The seatbelt tensioning assembly according to claim 3, wherein
   the serpentine shape of the seatbelt path is defined at least from the first seatbelt opening to the first guide member, extending partway around the first guide member and to the first tensioning member, extending partway around the first tensioning member and to the second guide member, extending partway around the second guide member and to the second seatbelt opening.

5. The seatbelt tensioning assembly according to claim 4, wherein
the tensioning device also includes a biasing member within the housing that is positioned to apply a biasing force to the first tensioning member such that with the biasing member in a non-compressed state biasing the first tensioning member to move a predetermined distance away from at least one of the first guide member and the second guide member, and with the biasing member in a compressed state and the first tensioning member being moved against the biasing force of the biasing member.

6. The seatbelt tensioning assembly according to claim 5, wherein
the seatbelt extends along the seatbelt path within the housing of the tensioning device such that the biasing member is moved to the compressed state in response to a predetermined level of force being applied to the first tensioning member by the seatbelt.

7. The seatbelt tensioning assembly according to claim 3, wherein
the tensioning device further includes a second tensioning member disposed within the housing, the second tensioning member being located along the seatbelt path between the first tensioning member and the second guide member, with the serpentine shape of the seatbelt path being defined at least from the first seatbelt opening to the first guide member, extending partway around the first guide member and to the first tensioning member, extending partway around the first tensioning member and to the second tensioning member, extending partway around the second tensioning member and to the second guide member, extending partway around the second guide member and to the second seatbelt opening.

8. The seatbelt tensioning assembly according to claim 7, wherein
the tensioning device also includes a second biasing member within the housing that is positioned to apply a biasing force to the second tensioning member such that with the second biasing member in a non-compressed state the second tensioning member moves a predetermined distance away from at least one of the first guide member, the second tensioning member and the second guide member, and with the second biasing member in a compressed state and the second tensioning member moves against the biasing force of the second biasing member.

9. A seatbelt tensioning assembly, comprising:
a tensioning device having a housing that defines a first seatbelt opening and a second seatbelt opening; and
a seatbelt configured for attachment to a vehicle body structure within a passenger compartment of a vehicle for restricting movement of a vehicle passenger during an impact event, the seatbelt extending through the housing of the tensioning device and with the seatbelt following a seatbelt path having a serpentine shape within the housing, with the seatbelt in a non-tensioned state the seatbelt passes through the housing, the seatbelt includes a torso restraining portion and a waist restraining portion with a section of the seatbelt between the torso restraining portion and the waist restraining portion being located within the housing of the tensioning device,
the tensioning device including:
a first guide member supported within the housing adjacent to the first seatbelt opening;
a second guide member supported within the housing adjacent to the second seatbelt opening;
a first tensioning member disposed with the housing operably between the first guide member and the second guide member such that the section of the seatbelt within the housing extends at least part-way around the first guide member, at least part-way around the first tensioning member and at least part-way around the second guide member within the housing thereby defining the seatbelt path; and
a biasing member positioned to apply a biasing force to the first tensioning member such that with the biasing member in a non-compressed state the first tensioning member is located a first distance away from the first guide member and a second distance away from the second guide member, and with the biasing member in a compressed state by movement of the first tensioning member, the tensioning member is located a third distance away from the first guide member and a fourth distance away from the second guide member, with the first distance being greater than the third distance and the second distance being greater than the fourth distance.

10. The seatbelt tensioning assembly according to claim 9, wherein
the seatbelt defines a first effective length with the biasing member being in the non-compressed state and the seatbelt defines a second overall length with the biasing member being in the compressed state the first effective length and the second effective length being defined by at least combined lengths of the torso restraining portion and the waist restraining portion such that the first overall length is greater than the second overall length by a predetermined distance.

11. The seatbelt tensioning assembly according to claim 9, wherein
the serpentine shape of the seatbelt path is defined from the first seatbelt opening to the first guide member, extending partway around the first guide member and to the first tensioning member, extending partway around the first tensioning member and to the second guide member, extending partway around the second guide member and to the second seatbelt opening.

12. The seatbelt tensioning assembly according to claim 9, wherein
the tensioning device further includes a second tensioning member disposed within the housing, the second tensioning member being located along the seatbelt path between the first tensioning member and the second guide member, with the serpentine shape of the seatbelt path being defined at least from the first seatbelt opening to the first guide member, extending partway around the first guide member and to the first tensioning member, extending partway around the first tensioning member and to the second tensioning member, extending partway around the second tensioning member and to the second guide member, extending partway around the second guide member and to the second seatbelt opening.

13. The seatbelt tensioning assembly according to claim 12, wherein
the tensioning device also includes a second biasing member within the housing that is positioned to apply a biasing force to the second tensioning member such that with the second biasing member in a non-compressed state biasing the second tensioning member to move a predetermined distance away from at least one of the first guide member, the second tensioning member and the second guide member, the seatbelt defines first overall length, and with the second biasing member in a compressed state and the second tensioning member being moved against the biasing force of the second biasing member such that the seatbelt defines a second overall length greater than the first overall length by a predetermined distance with the first effective length and the second effective length being defined by at least combined lengths of the torso restraining portion and the waist restraining portion of the seatbelt.

14. The seatbelt tensioning assembly according to claim 9, wherein
the seatbelt includes a buckle tongue member slidable installed to the seatbelt separate from the tensioning device.

15. The seatbelt tensioning assembly according to claim 14, wherein
the buckle tongue member includes a locking device that prevents movement of the seatbelt relative to the buckle tongue member in response to application of a predetermined level of force acting on the seatbelt.

16. The seatbelt tensioning assembly according to claim 9, wherein
the tensioning device includes a buckle tongue member that is fixedly attached to the housing.

17. The seatbelt tensioning assembly according to claim 16, wherein
the second guide member of the tensioning device includes a locking device that prevents movement of the seatbelt relative to the buckle tongue member and the tensioning device in response to application of a predetermined level of force acting on the seatbelt.

18. The seatbelt tensioning assembly according to claim 9, wherein
the first guide member and the second guide member are rotatably supported within the housing.

19. The seatbelt tensioning assembly according to claim 9, wherein
the first tensioning member is non-rotatably supported within the housing.

* * * * *